(12) United States Patent
Strothmann

(10) Patent No.: US 6,415,910 B1
(45) Date of Patent: Jul. 9, 2002

(54) FOWARD FEED DEVICE

(75) Inventor: Wilfried Strothmann, Schloss Holte-Stukenbrock (DE)

(73) Assignee: Wilfred Strothmann GmbH & Co. KG Maschinenbau und Handhabungstechnik, Schloss Holte-Stukenbrock (DE)

(*) Notice: Subject to any disclaimer, the term of this patent is extended or adjusted under 35 U.S.C. 154(b) by 0 days.

(21) Appl. No.: 09/568,350

(22) Filed: May 10, 2000

(30) Foreign Application Priority Data

May 10, 1999 (DE) .......................... 199 21 520

(51) Int. Cl.⁷ .............................................. B65G 25/04
(52) U.S. Cl. .................... 198/748; 198/746; 198/468.11
(58) Field of Search ................... 198/748, 746, 198/468.11

(56) References Cited

U.S. PATENT DOCUMENTS

| | | | | |
|---|---|---|---|---|
| 2,968,390 A | * | 1/1961 | Anderson | |
| 3,882,792 A | * | 5/1975 | McIntier | |
| 4,170,292 A | * | 10/1979 | Lang | 198/746 |
| 4,514,133 A | * | 4/1985 | Vercruysse | 198/746 X |
| 4,612,861 A | * | 9/1986 | Lidguist | 198/746 X |
| 4,669,249 A | * | 6/1987 | Aiuola et al. | 198/468.11 X |
| 4,834,233 A | * | 5/1989 | Wittwer | 198/746 |
| 5,699,896 A | * | 12/1997 | Spada et al. | 198/468.11 X |
| 5,816,381 A | * | 10/1998 | Bungter | 198/746 X |

* cited by examiner

Primary Examiner—Joseph D. Pape
Assistant Examiner—Lori L Coletta
(74) Attorney, Agent, or Firm—Richard M. Goldberg

(57) ABSTRACT

A forward feed device for conveyor tables includes a drive element (38) that can be moved to and fro, which moves out of the table area (36) during the forward movement and back underneath it during the return movement. The drive element comprises a pivotable latch (38) that can be moved upwards out of the table area in the forward feed direction, of which the end that leads and can be raised during the forward feed movement is supported, via a link (48) with two pivoting ends, by a friction block (54) that trails behind during the forward feed movement and the return movement, and that is slowed down by friction against a stationary surface.

10 Claims, 2 Drawing Sheets

FOWARD FEED DEVICE

BACKGROUND OF THE INVENTION

The invention relates to a forward feed device for conveyor tables with a drive element that can be moved to and fro, which moves out of the table area during the forward movement and back underneath it during the return movement.

There are a variety of prior art drive elements that are capable of pushing an item to be conveyed forwards in a particular direction and of dipping below the conveyor surface during the return stroke. Conveyor surfaces of this type will be referred to in this context as conveyor tables. They may be designed as roller or ball conveyors, belt conveyors with spaced belts or as simple sliding surfaces. A so-called transfer conveyor between the pressing stations of a press line can be regarded as an example although this is not, however, intended to restrict the scope of the validity of this invention. In this instance, sheet metal parts usually have to be moved into a given position for alignment against stops.

SUMMARY OF THE INVENTION

This invention will relate to a forward feed device that will, for example, allow a sheet metal plate to be pressed against stops as part of the aligning operation in front of a press. In more general terms, the intention of the forward feed device according to the invention is to allow an object of basically any form to be pressed against stops as part of the aligning operation in front of a work station of any type.

The invention is based on the task of providing a forward feed device of the said type which is relatively easy to manufacture and exhibits low inertia, therefore allowing it to be moved to and fro quickly.

To solve this task, the forward feed device of the invention is characterized in that the drive element comprises a pivotable latch that can be moved upwards out of the table area during the forward movement, of which the end that leads and can be raised during the forward feed movement is supported, via a link with two pivoting ends, by a friction block that trails behind during the forward feed movement and the return movement, and that is slowed down by friction against a stationary surface.

The friction of the friction block against the stationary surface causes the latch to be raised above the table area during the forward feed movement, and lowered below the table area during the return movement, because when the forward feed device moves in relation to the base, the friction block always tries to trail behind.

In connection with outlining the task of the invention it has already been pointed out that one of the aims of the invention is to ensure that the forward feed device exhibits low inertia so that it can be moved to and fro quickly. This goal is achieved by the fact that only the pivotable latch need be moved to and fro in connection with a suitable tension member, whilst the drive for the tension member can be stationary, with the pivoting action of the latch not requiring any externally supplied energy, i.e. no air cylinders, operating magnets or other similar elements as are frequently provided in prior art solutions. Another important point is that it is not necessary to run any moving power supply lines such as pneumatic air lines, electricity lines, etc., along with the drive element, because moving power supply lines on industrial plant are always subject to faults, can suffer wear and tear and make access to the plant more difficult.

BRIEF DESCRIPTION OF THE DRAWINGS

The friction of the friction block against the stationary surface ensures that the friction block trails behind as the forward feed device advances, and is able to raise the latch. There is a sufficient choice of suitable material combinations for this purpose. The friction block may also have a special friction lining on the side closest to the stationary surface, and a brake block that extends elastically from the friction block may also be provided. It may also be expedient to make the friction block from a relatively heavy material with a high inertia, whose surface closest to the stationary surfaces, insofar as the friction block rests on the latter, is pressed firmly against the stationary surface.

DETAILED DESCRIPTION

In this context it should be pointed out that the invention is not limited to applications in which the latch is moved upwards out of a conveyor surface. On the contrary, the spatial orientation of the latch and the direction in which it operates are basically immaterial. Hence the invention can, for example, be used with a downwardly movable latch for separating plates from a stack of plates. Insofar as terms such as "up" and "down" are employed in this context, they are used in relation to one form of embodiment in which the latch is raised upwards. These terms are therefore only used to simplify the description and should not be understood as obligatory indications of direction for practical applications.

The system for controlling the movement of the latch requires absolutely no maintenance or servicing, is subject to only minimal wear and tear, and works very reliably.

The drive element is preferably inserted into a gap in a strand of an endless tension member, e.g. a toothed belt. In this case the tension member is interrupted in the vicinity of the drive element, and the interruption is bridged by a connecting element with two upwardly projecting sides between which the latch can be pivotably mounted. When raised upwards, the latch should not be supported by its pivot axis, but by a supporting surface of the connecting element, because high forces, which could deform or damage the pivot axis, often occur.

In one preferred embodiment, the end of the latch that remains at the rear during a forward movement is also connected to the connecting element via a second link with two pivoting ends, which is shorter than the first link that raises the latch. This second link allows the latch to rest against the supporting surface of the connecting element, thereby ensuring that the latch axis is not exposed to forward movement forces.

To stabilize the latch and provide further guidance, a third link with two pivoting ends is preferably disposed between the point where the first link pivots with the latch and the connecting element.

Figure 1:
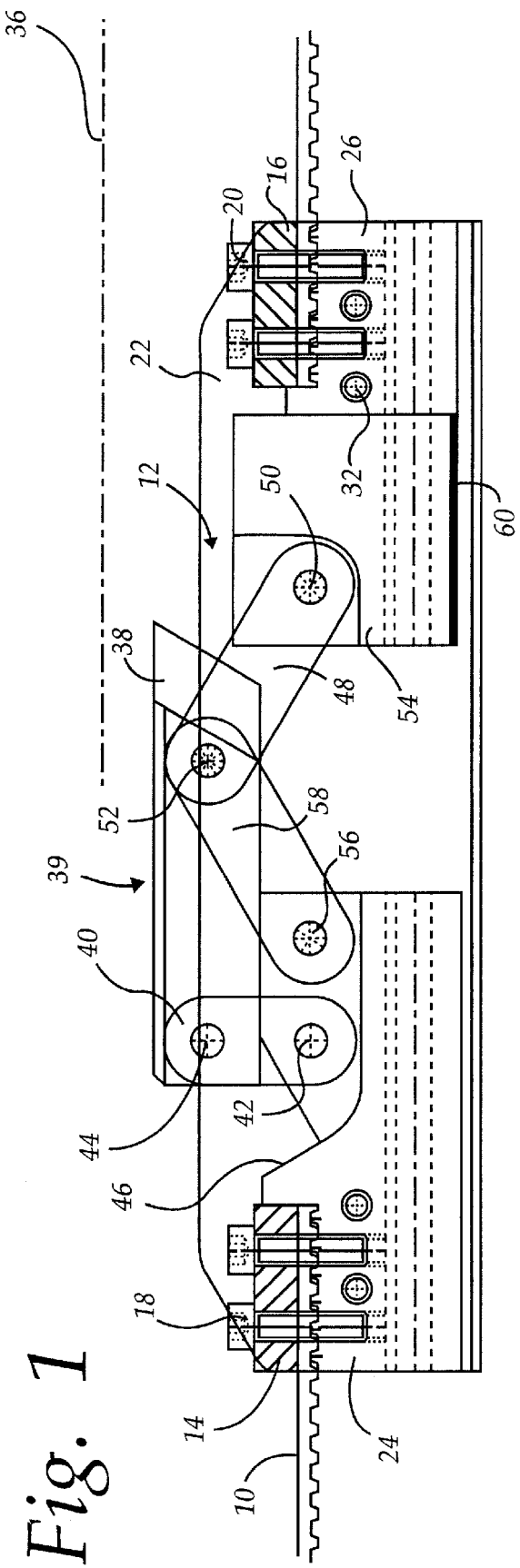
Figure 2:
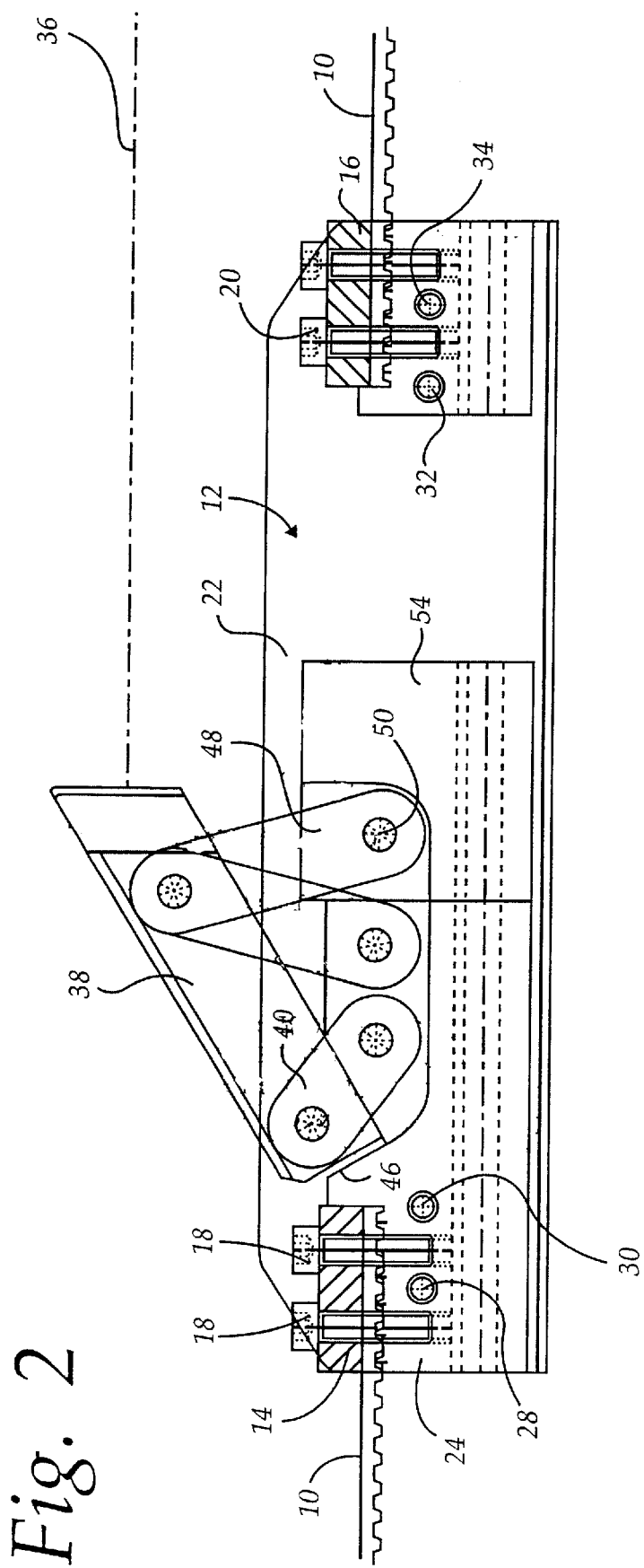

Preferred embodiments of the invention will be described in more detail below with reference to the enclosed drawings, in which FIG. 1 is a diagrammatic side view of the drive element of the invention, in the rest or return position;

FIG. 2 corresponds to FIG. 1, but shows the forward movement position

It is worth repeating at this point that the two drawings represent purely diagrammatic side views in which some hidden lines are shown and some lines are omitted insofar as this was expedient for the explanation.

In both figures, 10 designates a toothed belt that is interrupted in the vicinity of the drawings. This interruption is bridged by a connecting element 12 to which the ends of toothed belt 10 are attached on the left and right of FIGS. 1 and 2 with the help of a clamping element 14,16 and two clamping bolts 18, 20 at each end. The connecting element 12 has two lateral sides 22, which, in FIGS. 1 and 2, are positioned congruently one behind the other. Connecting element 12 may also be a closed U-profile. Between the two sides 22 in the embodiment illustrated there are connecting blocks 24, 26 in the two end portions, which, with the help of screws 28,30,32,34, which connect the two sides 22 perpendicular to the plane of the drawing, are connected with the sides to form one unit.

In FIGS. 1 and 2 a dot-dash line 36 indicates the table area or conveyor surface. The forward direction is intended to be oriented from left to right in the drawings, whilst the return direction is oriented from right to left. Attached to the connecting block 24 shown on the left of the drawings is the end of toothed belt 10 as well as a pivotably mounted latch 38 which can move between a horizontal resting position underneath the level of the table as shown in FIG. 1, and a position in which it is partially above the level of the table and raised upwards at an angle in the forwards direction. This raised position is shown in FIG. 2. Pivotally mounted latch 38 constitutes a drive element 39.

The latch 38 may be attached directly pivotably to connecting block 24 or connecting element 12, or indirectly via a link 40 with two pivoting ends which is connected to connecting block 24 on the one hand and latch 38 on the other with the aid of pivot axes 42 and 44 running perpendicular to the plane of the drawing. The main advantage of mounting pivoting latch 38 via link 40 is that when in the raised position, latch 38 can rest on a supporting surface 46 so that pivot axes 42,44 are not exposed to heavy forces that could impact on latch 38 during the forward movement.

The relatively short link 40 described above will also be referred to in this context as the second link.

The raisable end of latch 38 that leads the way in the forward direction is connected via a further link 48, which will also be referred to as the first link, with the aid of pivot axes 50 and 52, to a friction block 54 which can be moved forwards and backwards, i.e. to the right and left in FIGS. 1 and 2, between the two connecting blocks 24, 26. In detail, friction block 54 rests on a guide surface (not shown) on the base (not shown) of the conveyor table.

On e.g. its bottom surface, friction block 54 is provided with a friction lining 60 which works by ensuring that when the forward feed device moves in relation to the base, the friction block tends to trail behind. A brake plate (not shown) may even be embedded in the friction block in such a way as to extend elastically from the latter. A relatively heavy block of metal whose displacement along the guide surface is opposed by a certain friction force could also be used. Such friction force must be at least big enough to ensure that friction block 54 trails behind when the parts illustrated in FIGS. 1 and 2 move to the right and left, i.e. slides to the left in relation to connecting element 12, and when the parts move back towards the left, trails behind in relation to connecting element 12 until the friction block abuts against the connecting block 26 shown on the right-hand side. It is evident that this to and fro movement of friction block 54 relative to connecting element 12 causes link 48 to raise the latch above the conveyor surface during the forward movement, as shown in FIG. 2, and to lower it below the conveyor surface during the opposite movement.

Finally, a third link 58 is provided for the purpose of clearly defining the attachment between pivot axis 52, which connects the first link 48 with latch 38, and an additional pivot axis 56 on connecting block 24 shown to the left of the drawing. This link 58 is essentially the same length as the first link 48. The two longer links 48 and 58 essentially form an equal-sided triangle, whose top point, which is embodied by pivot axis 52 on the latch, is safely supported and guided by the two links 48,58.

It has already been stated that FIGS. 1 and 2 are purely diagrammatic drawings. Links 48,58 could, for example, also be provided in pairs, or in a plurality disposed behind each other. If connecting element 12 is a U-profile that is closed on the ground, said U-profile should have at least one window on the ground in the vicinity of the movement of friction block 54, via which friction block 54 can come into contact with a stationary guide surface.

What is claimed is:

1. A forward feed device for conveyor tables, comprising:
    a drive element that can be moved to and fro, and which moves out of a table area during movement in a forward feed direction and back underneath the table area during return movement, the drive element including a pivotable latch that can be moved upwards out of the table area in the forward feed direction,
    a friction block that trails behind during the movement in the forward feed direction and the return movement, and that is slowed down by friction against a stationary surface, and
    a first link having a first pivoting end connected with the friction block and a second pivoting end pivotally supporting an end of the drive element that leads and can be raised up during the movement in the forward feed direction.

2. The forward feed device of claim 1, wherein the drive element is inserted into a gap in a strand of an endless tension member.

3. The forward feed device of claim 2, the tension member includes a toothed belt.

4. The forward feed device of claim 2, wherein the tension member is interrupted in the vicinity of the drive element, and further comprising a connecting element with two upwardly projecting sides which bridges interruption.

5. The forward feed device of claim 4, wherein, in the raised position, the latch rests against a supporting surface of the connecting element.

6. The forward feed device of claim 5, further comprising a second link having a first pivoting end connected with an end of the latch that remains at a rear during movement in the forward feed direction and a second pivoting end connected to the connecting element, the second link being shorter than the first link that raises the latch.

7. The forward feed device of claim 6, further comprising a third link having a first pivoting end connected with a point where the first link pivots with the latch and a second pivoting end connected with the connecting element.

8. The forward feed device of claim 1, wherein the friction block has a friction lining on a side closest to the stationary surface.

9. The forward feed device of claim 1, wherein the friction block is fitted with an elastically extending brake plate.

10. The forward feed device of claim 1, wherein the friction block is made of metal.

* * * * *